Jan. 31, 1933.　　M. FINKENWIRTH　　1,895,754
MEASURING STICK
Filed Feb. 3, 1932
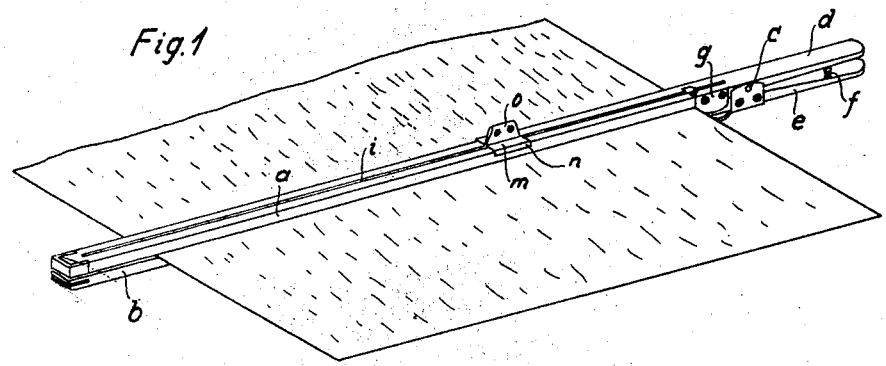
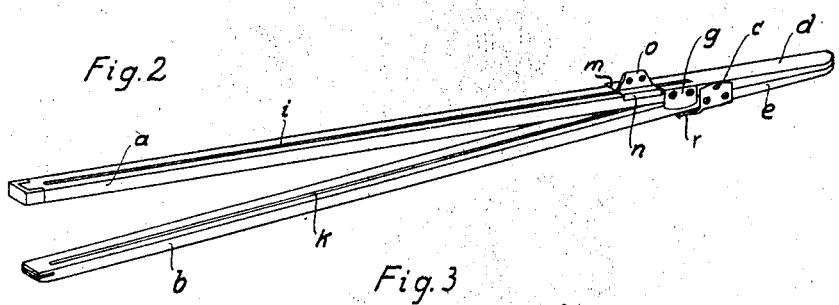
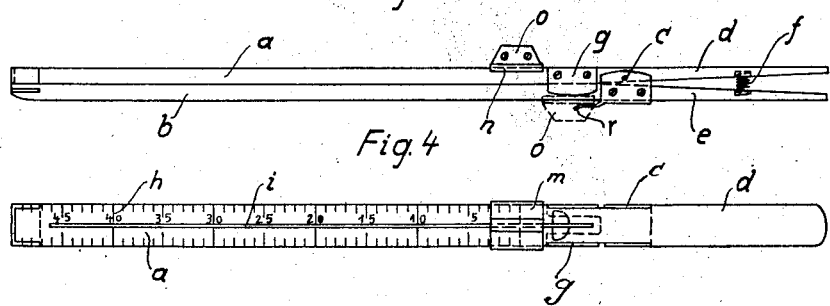
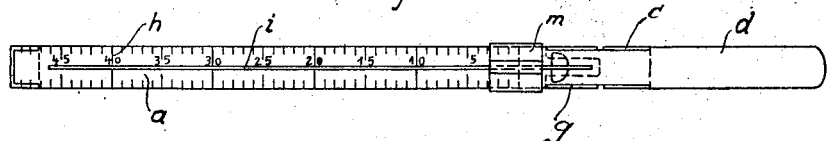
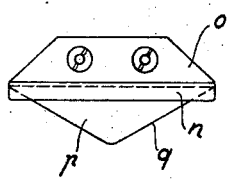
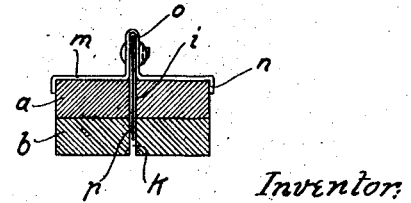
Inventor:
Max Finkenwirth Patented Jan. 31, 1933

1,895,754

UNITED STATES PATENT OFFICE

MAX FINKENWIRTH, OF DAHLEN, GERMANY

MEASURING STICK

Application filed February 3, 1932, Serial No. 590,653, and in Germany April 29, 1930.

This invention relates to a combined measuring device and cutter for dividing cloth and the like into pieces of any desired size, and the invention consists in the provision of a measuring stick divided into two overlapping, hingedly connected members adapted to clamp the material between them and formed each with a longitudinal slit, a slide which is guided on the upper member being provided with a knife which is guided in the slit for cutting the material clamped between the members.

Fig. 1 of the accompanying drawing is a perspective view showing a device according to the invention in operative position, Fig. 2 is a perspective view of the device itself with open members, Fig. 3 is a side view of the device showing the members closed, Fig. 4 is a top view of the device, Fig. 5 is a side view on an enlarged scale of the slide and knife, and Fig. 6 is a cross-section of the device.

The device comprises a measuring stick divided into two overlapping members $a$ and $b$ which are connected by hinge elements $c$ so that they can be opened out as shown in Fig. 2 for admitting between them a piece of cloth or the like which is to be cut up into pieces of definite sizes. The members are formed with diverging tail ends $d$ and $e$ which can be pressed together for opening the jaws. A spring element $f$ arranged between the tail ends normally maintain members closed. Both members are formed with centrally disposed, longitudinal slits $i$ and $k$ respectively in which a knife $p$ is guided. The knife is connected to a slide $m$ which is guided on the upper member. The slide may be formed from a metal plate part of which is doubled to form a raised back $o$ to which the knife is secured and which serves as an operating handle. The edges of the plate are turned down to form cheeks which engage the sides of the respective stick member.

On the slide being moved along the stick, the material clamped between the members of the latter will be cut, and the graduations $h$ on the stick will enable the operator to regulate exactly the extent of the cut.

The knife is V-shaped so as to present two inclined cutting edges $q$ allowing the cutting to be carried out in either direction.

Cheek plates $g$ connected to one of the stick members is adapted to engage the sides of the other member for the correct positioning of the latter. The guide and hinge elements are arranged flush with the stick members and with the sides of the slits to enable the slide to move freely across them.

For clamping the slide $m$ to the stick when not in use, spring elements $r$ may be connected, preferably to the hinge plates, so as to bear against the underside of the stick. The slide $m$ is adapted, when applied to the bottom member of the stick, to be pushed under said spring elements and to be held in position by the latter.

The knife may be formed from an old, suitably reshaped razor blade.

The device is particularly useful for dividing up flimsy material such as gauze and the like.

I claim:

1. A measuring stick comprising two overlapping, hingedly connected members adapted to clamp the measured material between them and formed each with a central, longitudinal slit, a slide guided on the upper member, a knife connected to said slide and guided in the slits of the two members for cutting the material, the members being formed with diverging tail ends extending beyond the hinge for the convenient opening of the members, and a spring arranged between said tail ends for maintaining the members normally closed.

2. A stick as claimed in claim 1 wherein the slide is formed with cheek plates which engage the sides of the stick member whereon it is guided.

3. The stick claimed in claim 1 in combination with spring elements bearing against the underside of the stick at opposite sides of the slit for clamping the slide to said underside when not in use.

4. A stick as claimed in claim 1 wherein the hinge elements are flush with the stick members and with the sides of the slits to enable the slide and knife to more freely across them.

MAX FINKENWIRTH.